United States Patent [19]

Southard

[11] E Re. 28,999

[45] Reissued Oct. 12, 1976

[54] AUTOMATIC RHYTHM SYSTEM PROVIDING DRUM BREAK

[75] Inventor: James S. Southard, Union, Mich.

[73] Assignee: C. G. Conn, Ltd., Oak Brook, Ill.

[22] Filed: Oct. 6, 1975

[21] Appl. No.: 620,127

Related U.S. Patent Documents

Reissue of:

[64] Patent No.: 3,764,722
Issued: Oct. 9, 1973
Appl. No.: 263,474
Filed: June 16, 1972

[52] U.S. Cl. ..... 84/1.03
[51] Int. Cl.[2] ..... G10H 1/00
[58] Field of Search..... 84/1.01, 1.03, 1.17, 84/1.24, DIG. 12

[56] References Cited

UNITED STATES PATENTS

| | | | |
|---|---|---|---|
| 3,358,068 | 12/1967 | Campbell | 84/1.01 |
| 3,544,693 | 12/1970 | Tripp | 84/1.01 |
| 3,585,891 | 6/1971 | Schwartz et al. | 84/1.03 |
| 3,610,799 | 10/1971 | Watson | 84/1.01 |
| 3,629,480 | 12/1971 | Harris | 84/1.03 |
| 3,629,481 | 12/1971 | Bunger | 84/1.03 |
| 3,646,242 | 2/1972 | Okamoto | 84/1.03 |
| 3,659,031 | 4/1972 | Adachi | 84/1.01 |
| 3,696,201 | 10/1972 | Arsem et al. | 84/1.01 |
| 3,697,661 | 10/1972 | Deutsch | 84/1.01 |
| 3,711,618 | 1/1973 | Freeman | 84/1.03 |
| 3,712,950 | 1/1973 | Freeman | 84/1.03 |
| 3,715,442 | 2/1973 | Freeman | 84/1.01 |

*Primary Examiner*—Stanley J. Witkowski
*Attorney, Agent, or Firm*—Drummond, Nelson & Ptak

[57] ABSTRACT

A rhythm system includes a memory for storing rhythm patterns, with a plurality of sections for controlling individual rhythm instruments, and instrument generators for producing sounds in accordance with the patterns. The patterns are stored in memory lines, with the number of counts in the patterns differing from one pattern to another. A plurality of short rhythm patterns can be stored on a single memory line. The system includes pushbutton switches for selecting the particular rhythm patterns and automatically selects the proper clock frequency for timing the selected rhythm pattern. The system is automatically reset at the end of the pattern and can selectively reset at the beginning of an intermediate position in the memory line, as required when a plurality of rhythms are stored in sequence on a single line. The system can also provide a special rhythm, such as a drum break, and this can be inserted during the playing of a selected continuous rhythm.

27 Claims, 6 Drawing Figures

CLOCK
DIVIDER
24 C GATE
32 C GATE
16 C GATE
FLIP FLOP
INST. ENABLE
+24 V
+24V.
24 V.

RESET
210
CLOCK
32
SCAN GEN. 1 THRU 32

209
38
220
36
INSTRUMENT GEN.
CRASH CYMBAL
SHORT BRUSH
LONG BRUSH
TAMBOURINE
CLAVE
BLOCK
SNARE
BONGO
CONGA
BASS DRUM
208
207
206
205
204
203
202
201
219
218
217
216
215
214
213
212
211
30
SWITCH CIR.
18 LINES
200
154

211
212
213
214
215
216
217
218
219
220
250
251
252
55
254
256
182
ORGAN
TONE INPUT
268
MODULATOR
AUDIO OUTPUT
52
260
184
186
185
262
265
264
180
181
183
SWITCH CIR.
30

AUTOMATIC RHYTHM SYSTEM PROVIDING DRUM BREAK

Matter enclosed in heavy brackets [ ] appears in the original patent but forms no part of this reissue specification; matter printed in italics indicates the additions made by reissue.

BACKGROUND OF THE INVENTION

Rhythm systems have been provided for use with electric organs, for example, so that the sounds of various rhythm instruments are automatically produced as the organist operates the keyboards and pedal board to provide organ tones. It is desired to provide various different rhythm patterns for different types of music, such as a march or waltz, and also more complex patterns such as a tango. It is also desired that the different patterns control various different rhythm instruments such as drums, brush and tambourine.

Prior systems to provide a wide variety of rhythm patterns, and which can be used to control a relatively large number of different instruments, have been complex, resulting in relatively expensive devices. Also, prior devices have not provided special effects which are desired, such as the interruption of a rhythm pattern to insert a rhythm break, such as a drum break. Although there is a substantial interest in such special effects, it has not been practical to provide the same in existing systems.

SUMMARY OF THE INVENTION

It is an object of the present invention to provide a simple and improved automatic rhythm system.

Another object of the invention is to provide an automatic rhythm system which includes a memory having a plurality of rhythms stored therein, with separate sections of the memories controlling rhythm patterns for different instruments, and with the rhythm patterns being individually selected.

A further object of the invention is to provide a rhythm system including a counter for controlling a plurality of different rhythm patterns which may have different numbers of counts and different timing, wherein the counter is automatically reset at the ends of the patterns.

Still another object is to provide a rhythm system having memory sections, with a plurality of rhythms being stored within the maximum count and available for individual selection.

Another object of the invention is to provide a rhythm system wherein the rhythm pattern for a drum break is stored in a memory and can be initiated to produce the drum sounds by touching a pushbutton.

A still further object of the invention is to provide an automatic rhythm system wherein any one of a plurality of rhythm patterns can be individually selected, and wherein the selected pattern can be interrupted for the insertion of a different rhythm pattern, such as a drum break, followed by the selected rhythm pattern.

In practicing the invention, a rhythm system is provided for automatically playing one or more of a plurality of selected rhythms. The system includes a switch circuit for selecting the rhythms and a logic circuit with memory units in which the rhythm patterns are stored. The patterns may be of different types with different numbers of counts, and the speed of the clock for reading out the patterns is controlled by the switch circuit to provide the desired rhythm patterns. The logic circuit applies pulses corresponding to the rhythm patterns to instrument generators for producing the rhythm instrument sounds. A particular rhythm may include sounds from a plurality of instruments, and a plurality of rhythms can be simultaneously played. The switch circuit cooperates with the logic circuit to reset the same at desired counts, so that the rhythm patterns are continuous. The reset may be at the beginning of the count or at an intermediate point. The memory units are identical and have facility for storing the same number of counts. Rhythms with lesser counts can be stored in series in the memory units, and the memory can be reset to pick out any one of the rhythms so stored.

The rhythm system has provisions for playing a special rhythm, such as a drum break, and this can be played at any time by operating a touch button. In the event that the special rhythm is called for when another rhythm is being continuously played, the continuous rhythm will be interrupted to provide the rhythm break, with the continuous rhythm automatically starting again at the end of the break.

DETAILED DESCRIPTION

Figure 1:
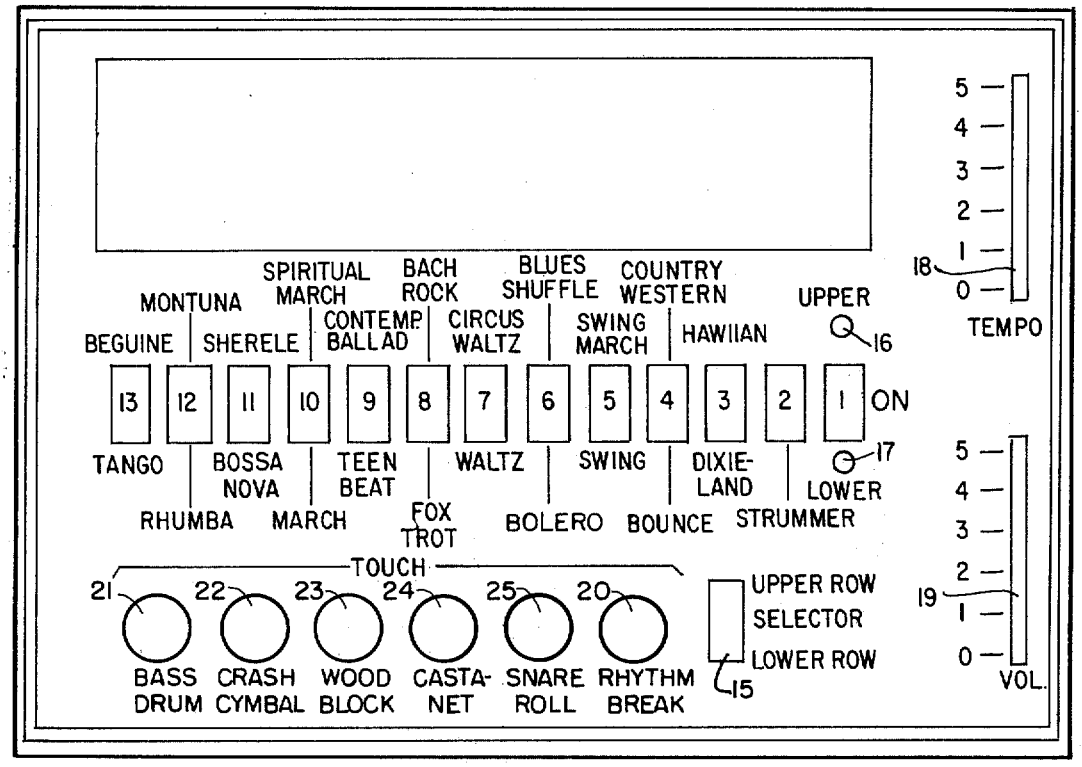
FIG. 1 shows the control panel for the rhythm system.

FIG. 1 shows the control panel for the instrument system of the invention, and this may be built into an organ or provided as an accessory for use with any musical instrument. The panel includes a number of pushbutton switches numbered 1 through 13, with switch number 1 being the on-off switch for the system. Switch 2 provides control of the Strummer action and switches 3 through 13 each control two rhythm patterns. The rhythm patterns are marked above and below the switches on the panel.

A slide selector switch 15 is provided to select the rhythm pattern indicated either above (upper row) or below (lower row) the switches 3 through 13. When the switch 15 is in the position to actuate the rhythms in the upper row, the light 16 marked UPPER flashes on the down beats and when the switch 15 is in the position to actuate the rhythms in the lower row, the light 17 marked LOWER flashes on the down beats. Accordingly, if a rhythm which is indicated above the switches 3 to 13 is desired, the selector switch 15 must be in the upper position, and if a rhythm indicated below the switch button is desired, the selector switch 15 must be in the lower position.

At the upper right side of the control panel is a TEMPO selector 18 which operates a potentiometer to control the tempo or speed of the rhythm. This is a slide operated potentiometer having positions marked 0 through 5. A volume control selector 19 is also provided at the lower right hand side, with positions marked 0 to 5. This controls the volume of sound from the instrument generators which produce the rhythm sounds.

A plurality of touch buttons are provided along the bottom of the control panel to select other operations of the system. The button 20 designated Rhythm Break provides the insertion of a special rhythm, such as a drum break. The pushbuttons 21 to 25 each control an output of the instrument generators of the system, as indicated on the drawing. These touch buttons provide a single operation or burst of sound, rather than a continuous rhythm as provided by the switches 2 to 13 in the center of the control panel.

Figure 2:
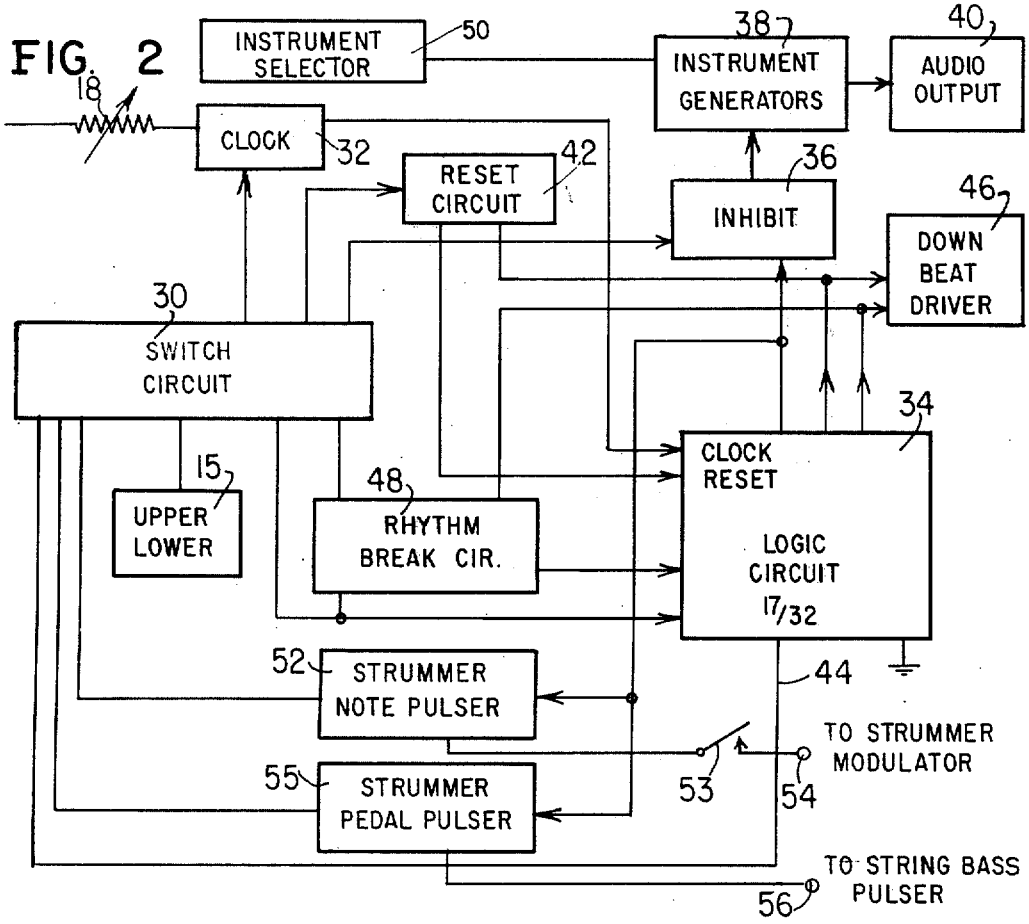
FIG. 2 is a block diagram of the rhythm system of the invention.

FIG. 2 is a block diagram of the rhythm system of the invention. The controls provided by the pushbuttons 1 to 13 on the control panel, as well as the Rhythm Break button 20 are provided in the block 30, which is designated switch circuit. The speed control 18 is shown as a variable resistor, and controls the speed of the clock 32. The clock applies pulses to a logic circuit 34 which includes memory devices. Logic patterns are stored for a plurality of different rhythm patterns for control of a plurality of rhythm instruments. Pulses for these patterns are applied from the output cable of the logic circuit through inhibit gates 36 to the instrument generators 38. The instrument generators may provide any desired number of instrument sounds, and in the system to be described 10 different rhythm instrument sounds are provided. The rhythm patterns controlling each instrument sound is applied separately from the logic circuit 34 through the inhibit gates 36 to the instrument generators 38. The signals from the generators are then applied to an audio system 40, which may include loudspeakers for reproducing the instrument sounds. It may be desired to apply the tone signals to the same audio amplifiers and loudspeakers which produce sounds for other musical tones, such as the tones of an electric organ.

The automatic pushbuttons of switch circuit 30 will select one or more of a plurality of patterns stored in the logic circuit 34, with 18 different patterns being stored in the system to be described. The logic circuit has facilities for handling rhythm patterns having up to 32 counts. The switching circuit 30 also sets up the reset circuit 42 to reset the logic circuit after the number of counts in a particular rhythm pattern. For example, rhythm patterns may be used having 16, 24 and 32 counts. The switching circuit also conditions the clock 32 to apply a particular division of the clock frequency to the logic circuit for the rhythm pattern selected.

Inasmuch as the logic circuit 34 has facilities for 32 counts, it is possible to provide two 16 count patterns within the 32 count logic. In such case, an input is applied to the logic circuit from the switching circuit 30 on line 44 so that the second pattern starts from the 17th count and continues to the 32nd count.

A down beat drive circuit 46 is provided for actuating the lights 16 and 17 on the control panel. This indicates whether the selector switch 15 is in a position for selecting the upper row or the lower row rhythms, as well as indicating the down beats.

A rhythm break circuit 48 is provided which is put into operation by actuation of the Rhythm Break switch 20 on the control panel. This is controlled by the switching circuit 30 to insert a particular rhythm pattern. If a rhythm is being played, the Rhythm Break switch will interrupt the rhythm which has been selected and insert a different rhythm. This may be a particular one of the rhythm patterns controlled the pushbuttons, or a separate rhythm pattern which is provided in the memory of the logic circuit. As previously stated, other touch buttons are provided on the control panel to select particular instruments. This action is provided by the block 50 in the diagram of FIG. 2.

The system can also be used to apply rhythm patterns to tones which may be provided by another instrument, such as an organ with which the rhythm system is used. The output from the logic circuit is applied to pulser 52 which applies rhythm patterns through switch 53 to an output terminal 54, which can control a modulator. This can be used to modulate tones from the instruments, such as chords which are provided by the accompaniment manual of an organ. A further pulsing circuit 55 is provided which is controlled by the logic circuit 34. This produces a rhythm pulse output pattern at terminal 56 which can be used to pulse a particular sound from the instrument, such as a string bass sound controlled by an organ pedal.

Figure 3:
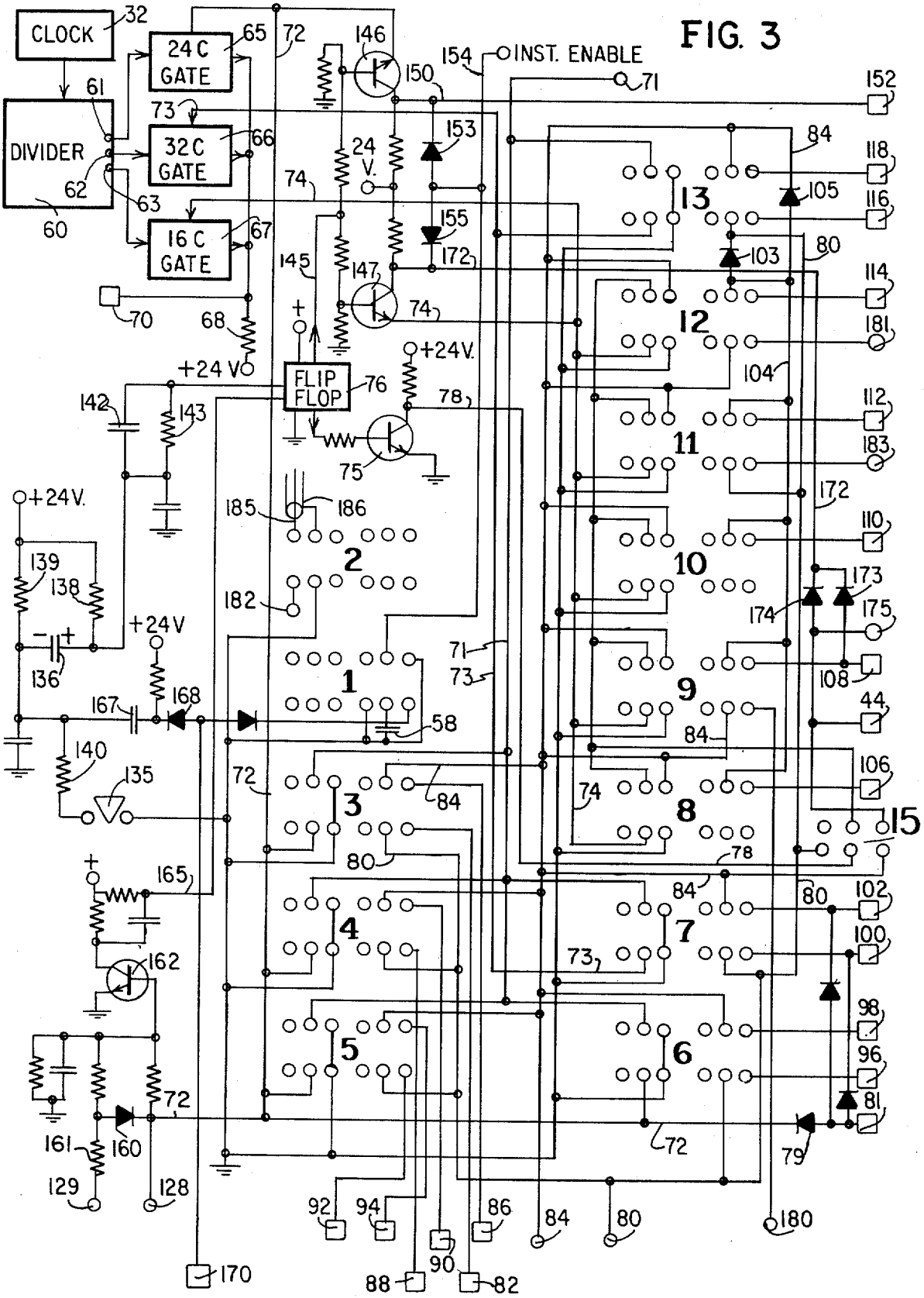
FIG. 3 is a circuit diagram of the switching circuit and the rhythm break circuit.

FIG. 3 illustrates the switching system 30, the clock 32, and the rhythm break circuit 48 of FIG. 2. The clock pulses for the logic circuit are provided by the clock 32, which may have its speed controlled as indicated by the control 18 in FIGS. 1 and 2. Pulses from the clock 32 are applied to divider 60 which has three outputs, output 61 which provides the clock frequency divided by four, output 62 which provides the clock frequency divided by three, and output 63 which provide the clock frequency divided by six. The three outputs of divider 60 are applied from terminals 61, 62 and 63 to gates 65, 66 and 67. The gates are selectively enabled so that one of the three divisions of the clock frequency is applied across resistor 68. This clock output is applied to terminal 70, which is an input terminal to the logic circuit 34 of FIG. 2.

The switches 1 through 13 on the control panel of FIG. 1, and the circuits connected thereto are shown in FIG. 3. Each of these is illustrated as a four section switch, with each section being a single pole, double throw, switch. In the OFF position, the center contact and the left contact of each section are interconnected, and in the ON position, the center contact and the right contact of each section are interconnected. In some cases only part of the switch sections are used, but in the actual device the switches are identical and all sections are shown in the drawing.

The on-off switch 1 has connections only to two sections thereof, the upper right and lower right sections. In the ON position, the upper right section provides a ground from the right contact to the center contact thereof, which is connected to the Instrument Enable terminal 154. This ground releases the inhibit gates 36 and permits operation of the instrument generators, shown as the blocks 36 and 38 in FIG. 2. Accordingly, when the rhythm system is ON, the instrument generators are enabled. The lower right section of switch 1 in the ON position connects the right contact to the center contact to provide a connection from capacitor 58 to the reset terminal 170 connected to the logic circuit. In the OFF position, the capacitor 58 is grounded by the connection between the left contact and the center contact of the lower right switch section. When the switch is turned on, capacitor 58 charges to develop a negative pulse which is applied to terminal 170 to insure that the logic circuit is reset to the number one count position.

As previously stated, the switches 3 through 13 each control two rhythm patterns which are stored in a memory in the logic circuit. The switches, in addition to selecting a part of the memory, also select the clock frequency applied to the logic circuit. The rhythm patterns controlled by switches 3 to 7 inclusive are all 24 count rhythms, the patterns controlled by switches 8 to 12 are 16 count rhythms, and the patterns controlled by switch 13 are 32 count rhythms. Two 16 count patterns associated with switches 8 to 12 are stored in sequence on a 32 count line of the memory. Considering switch 8, for example, the Fox Trot rhythm is stored in counts 1 to 16 and the Bach Rock is stored in counts 17 to 32.

The slide selector switch 15, which selects one of the two rhythms associated with each of the pushbutton switches 3 to 13, is a two section switch, with each section being a single pole, double throw, switch. To select the lower row of rhythms, the selector switch 15 is in the position that the left and center contacts of each section are connected, and to select the upper row, the switch 15 is in the position that the center and right contacts of each section are connected.

Switch 3 provides the circuits for enabling the Dixieland and Hawaiian rhythms. To select the Dixieland rhythm, switch 15 is moved to its lower row selecting position, with the left and center contacts thereof interconnected. There is no connection to the upper left contact of switch 15, so that only the lower left and center contacts are operative. Switch 3, when operated, interconnects the center and right contacts of all four switch sections. The right contact of the two left sections of switch 3 are both connected to ground, and this ground is applied by the upper left section to conductor 71, the operation of which will be described. The lower left section of switch 3 connects the ground to conductor 72 which enables the 24 count gate 65, so that the clock frequency at terminal 61 of divider 60, which is the clock frequency over 4, will be applied across resistor 68. This frequency then appears at terminal 70 which applies the clock frequency to the logic circuit. The ground on conductor 72 is applied through diode 79 to terminal 81, which is connected to the logic circuit to reset the same after 24 counts.

In the normal operation of the rhythm system, transistor 75 is rendered conductive by a positive potential applied to the base thereof from the set-reset flip-flop circuit 76. This effectively grounds the collector of transistor 75 to apply a ground to conductor 78. This conductor is connected to the center contact of the lower section of the selector switch 15. When this switch is in the lower row position, this ground is applied to the left contact thereof which is connected to conductor 80. This conductor is connected to the center contact of the lower right section of switch 3. Accordingly, the ground is applied through this switch section to the lower right contact thereof which is connected to terminal 82. This terminal is connected to the logic circuit to select the Dixieland rhythm pattern which is stored in the memory thereof.

The upper right section of switch 3 is not effective when the selector switch 15 is in the lower row position. When switch 15 is in the upper row position, so that the center and right contacts of the sections thereof are connected, the ground on the lower center contact received from conductor 78 is applied to the lower right contact, which is connected to conductor 84. This conductor is connected to the center contact of the upper right section of switch 3 and the ground thereon is applied from the right contact thereof to the terminal 86. This terminal is connected to the logic circuit, and is operative to select the Hawaiian rhythm stored in the memory thereof. Accordingly, when switch 3 is operated and the selector switch 15 is in the upper row position, the Hawaiian rhythm pattern is selected rather than the Dixieland pattern. Although the center and right contacts of the upper section of the selector switch 15 are engaged when the switch 15 is in the upper row position, this connection is effective only when one of the switches 8 through 12 is operated for a 16 count rhythm pattern.

The operation produced by the pushbutton switches 4 to 7 is essentially the same as that of the switch 3 which has been described. Switch 4 provides a ground to output terminal 88 to select the Bounce rhythm in the memory when the lower row is selected, and provides a ground to terminal 90 to select the Country and Western rhythm in the memory when the upper row is selected. Switch 5 provides a ground to terminal 92 to select the Swing rhythm when the selector 15 is in the lower row position, and provides a ground to terminal 94 to select the Swing March rhythm when switch 15 is in the upper row position. Switch 6 provides a ground to terminal 96 when the lower row is selected to provide a Bolero rhythm, and when the upper row is selected provides a ground to terminal 98 to select the Blues Shuffle rhythm in the memory. Switch 7 provides two Waltz rhythm patterns, providing the normal Waltz pattern when the selector is in the lower row position to apply a ground at terminal 100, and providing a Circus Waltz when the selector is in the upper position to provide a ground at terminal 102.

It will be noted that when switch 7 is operated to provide the Waltz patterns, the center contact of the lower left section is not connected to the conductor 72 for operating the 24 count gate 65, as is the case of switches 3 to 6. The center contact of the lower left section of switch 7 is instead connected to conductor 73 which enables the gate 66. This is the 32 count gate which passes the clock frequency divided by three. This connection is used because the timing of the 32 count clock has been found to be more appropriate for the Waltz rhythms. This applies to both the normal Waltz and the Circus Waltz.

The operation of the switches 8 through 12, inclusive, to select a rhythm pattern will now be described. As previously stated, these switches control 16 count rhythms, and the two rhythms controlled by each switch are stored on a single line in the memory. Accordingly, each switch provides a connnection to only one terminal which is connected to the logic circuit to enable one line of the memory.

Operation of the switch 8 causes the lower left section thereof to apply ground from the right terminal to the center terminal which is connected to conductor 74. This enables gate 67 to pass the clock frequency divided by six to the terminal 70. Assuming that the selector switch 15 is in the lower row position, the ground applied from conductor 78 to the center contact of the lower section is applied to the left contact thereof. This ground is applied through conductor 80, diode 103, and conductor 104 to the center contact of the upper right section of switch 8. When switch 8 is operated, this center contact is connected to the right contact, which is connected to output terminal 106 for selecting the Fox Trot and Bach Rock patterns. The Fox Trot pattern takes up the first 16 counts, and the memory will be reset after 16 counts to repeat the pattern, in a manner to be described.

When the selector switch 15 is in the upper row position, the ground from the center contact of the lower section will be applied to the lower right contact, and to conductor 84 which is connected through diode 105 to the conductor 104. This will continue the ground on the center contact of the upper right section of switch 8, so that it will continue to be applied to output terminal 106. As the selector switch 15 is in the upper row position, a connection is made through the upper section of the selector switch to output terminal 44 which provides the command to the logic circuit to start at count 17. This circuit extends from conductor 84 to the right contact of the upper left section of switch 8 to the center contact thereof, and to the center contact of the upper section of switch 15. Accordingly, the ground from the right contact of the lower section of selector switch 15 is applied through conductor 84 to the right contact of the upper left section of switch 8, and through the center contacts of this switch section and of the upper section of selector switch 15 to the output terminal 44, which causes the logic switch to scan through counts 17 to 32.

Each of the switches 9, 10, 11 and 12 operates to select two different rhythm patterns in generally the same way as described in connection with switch 8. Switch 9 selects the Teen Beat and the Contemporary Ballad patterns, and when operated provides a ground at terminal 108 which is connected to the logic circuit to select the line in the memory in which these two rhythms are stored. Switch 10 selects the March and the Spiritual March, and when actuated provides a ground on terminal 110. Switch 11 selects the Bossa Nova and the Sherele and provides a ground at output terminal 112. Switch 12 selects the Rhumba and Montuna and provides an output at terminal 114 to select these two rhythms in the memory of the logic circuit.

Switch 13 provides two 32 count rhythms, in the lower row the Tango, and in the upper row the Beguine. The connections for the 32 count rhythms are generally the same as for the 24 count rhythms, except the connection from the center contact of the lower left section is to conductor 73 which enables the 32 count gate 66, rather than to conductor 72 which enables the 24 count gate 65. The selector switch 15 in the lower row position provides a ground from its lower left contact to the center contact of the lower contact section of switch 13, to provide a ground at output terminal 116. When the selector switch 15 is in the upper row position, the ground from the center contact of the lower section is transferred from the left contact to the right contact which grounds conductor 84, to ground the center contact of the upper right hand section of switch 13. This ground is transferred through this switch section to the right contact, which is connected to the output terminal 118. The terminal 116 when grounded will select the Tango rhythm in the memory, and the terminal 118 when grounded will select the Beguine rhythm.

The system of the invention has provisions for inserting a rhythm break by interrupting a rhythm pattern being played. This is accomplished by operation of switch 135, one side of which is connected to ground. The rhythm break is initiated by action of capacitor 136 which normally has no charge thereon. As shown in FIG. 3, both sides of capacitor 136 are connected to the positive potential, the right side of resistor 138 and the left side by resistor 139, When switch 135 is closed, ground is connected through resistor 140 to the left side of capacitor 136, so that the capacitor 136 charges, with the left side going negative, and the right side going positive, as marked. The positive going pulse at the right side of capacitor 136 is coupled through capacitor 142 and resistor 143 to the flip-flop circuit 76. The flip-flop circuit 76 normally provides a high potential to the base of transistor 75 to saturate this transistor so that its collector is at ground potential, as previously stated. The positive pulse applied to the flip-flop causes the same to change the potential applied to the base of transistor 75 so that it goes negative to turn off transistor 75, and remove the ground from conductor 78. This disables the rhythm which had been selected.

Flip-flop 76 also applies a positive potential to conductor 145, which is connected to the base electrodes of transistors 146 and 147, in response to the rhythm break pulse. In the event that a 24 count rhythm has been selected, a ground is present on conductor 72 which is connected to the emitter of transistor 146. Transistor 146 is rendered conducting by the positive potential applied to its base so that the ground applied to its emitter is also applied to its collector to effectively ground conductor 150. Conductor 150 is connected to terminal 152, which is connected to the logic circuit to enable a drum break rhythm which is stored in the memory. The low potential on the collector of transistor 146 is also transferred through diode 153 to conductor 154 which enables the instrument generators. This is illustrated in FIG. 2, wherein the inhibit circuit 36 is coupled between the logic circuit and the instrument generators. The ground potential on conductor 154 will remove the inhibit action of circuit 36 so that the instrument generators are operated by the logic circuit.

When the Rhythm Break button 135 is operated, the negative going potential at the junction of resistor 140 and capacitor 136 is coupled through capacitor 167 and diode 168 to terminal 170. This terminal is connected to terminal 132 in the logic circuit to reset the same. Accordingly, operation of the Rhythm Break button assures that the logic circuit is reset so that the drum break will start on count 1.

The rhythm break is terminated at the end of the 24 count pattern by the connection from conductor 72, which is grounded by each of the buttons controlling a 24 count rhythm. This conductor is connected to the cathode of diode 160 to ground the same. Upbeat signals from conductor 129 of the logic circuit, which are connected through resistor 161 to the anode of diode 160, will therefore be shunted to ground. However, down beat signals from conductor 128 will be coupled to the base of transistor 162 and will be amplified and inverted thereby. The amplified signal will be applied on conductor 165 to the flip-flop circuit 76 to reset the same so that it applies a positive potential to the base of transistor 75 to saturate the same so that the collector thereof applies a ground to conductor 78. This restores the operation of the selected rhythm pattern.

The Rhythm Break button can also be operated when a 16 count rhythm has been selected. In such case, the emitter of transistor 147 is connected to ground through conductor 74 and one of the switches 8 to 12, which are operated for the 16 count rhythms. Accordingly, when the Rhythm Break switch is depressed and flip-flop circuit 76 is operated, the transistor 75 is cut off and transistor 147 is rendered conducting to apply the ground potential from conductor 74 to its collector. This provides a ground on conductor 172 which is applied through diode 173 to the terminal 108, and through diode 174 to the terminal 44. The ground applied at terminal 108 selects the same rhythm selected by switch 9, which includes the Contemporary Ballad. The ground applied at terminal 44 enables the 17 to 32 count circuit so that it is the rhythm in the 17 to 32 count portion of the memory which is enabled. This is the Contemporary Ballad. Diode 155 connected between the collector of transistor 147 and conductor 154 provides a ground to enable the instrument generators.

When the logic proceeds from the 17th to the 32nd count, and returns to count 17, there will be a positive pulse from the upbeat circuit on conductor 129. This is applied through diode 160 to the base of transistor 162, which provides a pulse at its collector to reset the flip-flop 76. It is noted that conductor 72 is not grounded during the 16 count rhythm, so that diode 160 is not grounded as when a 24 count rhythm has been selected. Transistor 75 is then turned on to allow the previously selected rhythm to operate.

The ground applied through diode 174 is also applied to conductor 175 to disable gate 130 (FIG. 5), as when the selector switch 15 is in the upper row position. This is required because the Contemporary Ballad is stored from the 17th to 32nd counts and the system must be in the same condition as when the selector switch 15 is in the upper row position.

The rhythm break circuit can also be operated when the on-off switch 1 is in the OFF position and no rhythm selected by switches 3 to 13 is being played. To provide the rhythm break operation in such case, one of the switches 3 to 6 or 8 to 12 must be operated. This will cause the drum break stored in the memory, and enabled by grounding conductor 152 to be played when one of the switches 3 to 6 (for a 24 count rhythm) is operated. The contemporary Ballad will be played if one of the switches 8 to 12 for a 16 count rhythm is operated when the Rhythm Break button is pressed. Although the conductor 154 which enables the instrument generators will be grounded through switch 1 in this case, it will be grounded through the diode 153 or diode 155 in response to operation of the flip-flop circuit 76 and the conduction of transistor 146 or 147, as has been previously described.

Figure 4:
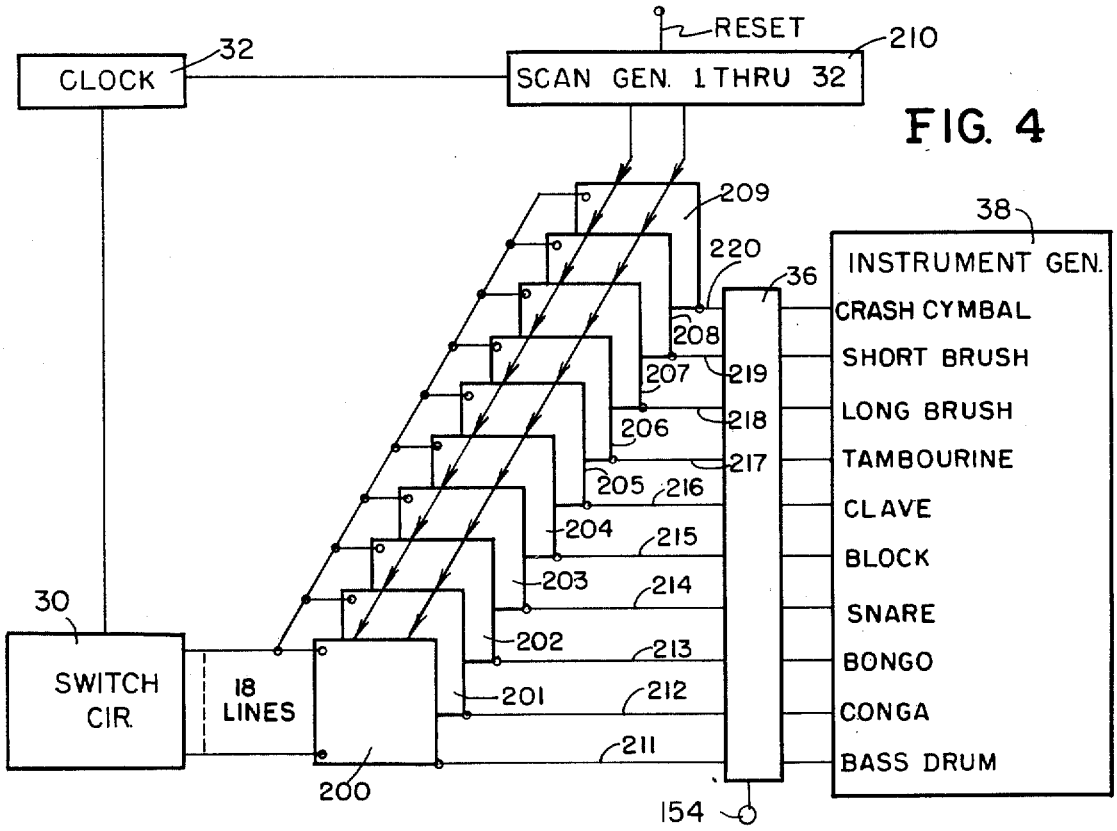
FIG. 4 illustrates the logic circuit and coupling to the instrument generators.

FIG. 4 illustrates the logic circuit 34 of the block diagram of FIG. 2. This includes a plurality of memory planes 200 to 209, each of which stores patterns for controlling one rhythm instrument. The memory planes have a plurality of lines which are selectively enabled by the switch circuit 30, with 18 lines being provided in one embodiment. Each memory line has 32 storage points thereon which are scanned in sequence by the scan generator 210. Pulses from the clock 32 are applied to the scan generator 210 to control the speed of scanning. The scan generator has 32 output lines which are coupled to the 32 points of each memory plane. All of the lines of all the memory planes are simultaneously scanned.

When a point having an input stored therein is scanned, an output is produced which is applied through the inhibit circuit 36 to the instrument generator 38. Outputs may be simultaneously produced by a plurality of lines of a plurality of planes. The outputs for all lines of each plane are provided from a single terminal, with the terminals being numbered 211 to 220. The output from each memory plane operates one instrument, and outputs may be simultaneously applied from a plurality of planes to operate a plurality of instruments. As previously stated the instrument generators may produce 10 separate instrument sounds, which are listed in the block 38 of FIG. 4. It is obvious that other sounds can be provided, if desired.

Figure 5:
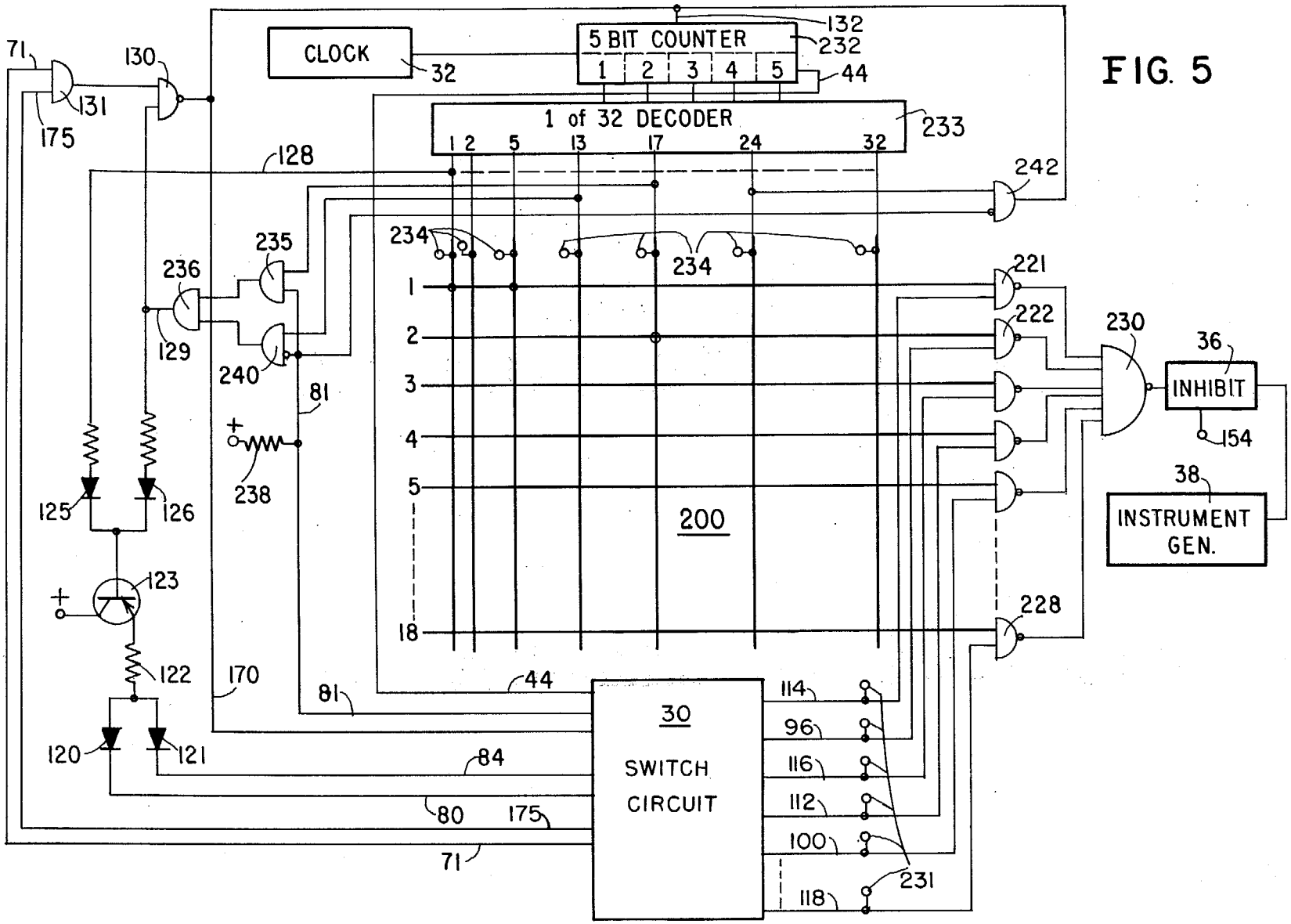
FIG. 5 shows a single memory plane with the connections thereto.

FIG. 5 shows the construction of one memory plane 200 in more detail, and shows the connections of the scan generator 210 and the switch circuit 30 thereto. The scan generator 210 includes a five bit counter 232 which applies signals to a one of 32 decoder 233. The counter 232 has five stages, each of which provides a binary output, to thereby provide 32 different counts, and then resets to repeat the count. The decoder 233 responds to the five binary outputs and applies pulses on 32 output lines in sequence. The 32 lines are connected to all of the memory planes, with the connections to plane 200 being shown. Terminals 234 are shown for connection to the other memory planes 201–209. Each pulse from the decoder 233 is simultaneously applied by a vertical line to all of the memory planes.

The memory plane 200, as previously stated, has 18 horizontal memory lines, which are illustrated as horizontal conductors marked 1 to 5–18. Each line has 32 storage points thereon, which may be connected to the lines from decoder 233. The storage points may be diodes which interconnect the memory lines to the lines from the decoder for coupling pulses from the decoder to the lines on the memory planes. The points which are connected are indicated by dots at the intersection of the decoder output lines and the memory lines.

The memory plane 200 may be the plane for operating the bass drum, and the lines 1 to 18 thereof are enabled by the switching circuit 30 in accordance with the rhythm pattern or patterns selected. For example, the patterns, for the Rhumba and Montuna rhythms may be stored on line 1, with points 1 to 16 providing the counts for the Rhumba and points 17 to 32 providing the counts for the Montuna rhythm. The 24 counts in the Bolero rhythm can be stored by the first 24 points on line 2 of plane 200, etc. At the points along the memory lines which are to produce outputs in response to scanning, a connection is provided between the vertical lines extending from the 1 to 32 decoder and the horizontal memory lines, to thereby store information as to the counts on which an output is to be produced. Accordingly, as the one of 32 decoder sequentially applies pulses to the vertical lines, outputs will be coupled to the interconnected horizontal lines.

Each horizontal line of the memory plane is coupled to an AND gate, with line 1 being coupled to AND gate 221, line 2 to gate 222, line 18 to gate 288, etc. Enabling voltages are selectively applied to the AND gates 221 to 228 from the switch circuit 30, being applied from conductors 114, 96, 116, etc. thereof. Accordingly, for the rhythms selected, the counts will be read out through AND gates 221 to 228 to OR gate 230. OR gate 230 provides all of the pulses for a particular instrument, and these pulses are applied through the inhibit circuit 36 to the instrument generators 38. A separate set of AND gates and an OR gate is provided for each memory plane, but the same enabling conductors from switch circuit 30 are connected to the AND gates for all planes. Terminals 231 are shown on the enabling conductors for connection to the memory planes 201 to 209, so that the corresponding lines of all memory planes are simultaneously enabled.

The down beat pulses are derived from conductor 128 which is connected to the first vertical output lines from decoder 233, which represents the first count. The upbeat pulses are normally derived from the vertical output line from decoder 233 for the 17th count through AND gate 235 and OR gate 236, and applied to conductor 129. AND gate 235 is normally enabled by the positive voltage applied through resistor 238. In the event that a 24 count rhythm is selected, a ground is applied to conductor 81, and this removes the positive input to AND gate 235 so that the AND gate 235 is disabled. A second connection is provided to OR gate 236, from the 13 count vertical conductor through AND gate 240. The second input to AND gate 240 is an inverting input from the conductor 81. Since conductor 81 is normally positive, the inverting input will disable AND gate 240. However, when conductor 81 is brought to ground potential, the inverting input will enable AND gate 240, so that the pulse for the 13th count will be applied therethrough to the OR gate 236. In this instance, the pulse from the 13th count will be applied to the conductor 129 as the upbeat output.

The 5 bit counter 232 will normally reset after the 32nd count so that it operates continuously to provide the 32 outputs in sequence. When a 24 count pattern is selected, it is desired that the counter be reset at the end of the 24th count. This is accomplished by AND gate 242 which is connected to the 24 count output of decoder 214. The gate 242 has an inverting input connected to conductor 81 which normally holds the AND gate 242 disabled. However, when conductor 81 is grounded, the inverting input enables AND gate 242 to pass the reset pulse to terminal 132 of the counter 212 to reset the same at count 24. The conductor 170 of the switch circuit 30 is also connected to terminal 132 of the counter to reset the same.

When playing a 16 count rhythm, it is necessary to reset the counter to count 1 after 16 counts have been scanned. At the 17th count, the positive going pulse developed at terminal 129 (upbeat) of the logic circuit is applied to AND gate 130, and if this gate is enabled, the pulse is applied to the reset terminal 132 of the counter 212. gate 130 can be disabled by a ground potential applied thereto from either conductor 71 or conductor 175 through the OR gate 131. Conductor 71 is grounded when any one of the switches 3 to 6 or 13 is operated, and conductor 175 is grounded when any one of switches 8 to 12 is operated and the selector switch 15 is in the upper row position, and when the drum break is being played. This disables AND gate 130 when any 24 count rhythm or 32 count rhythm is being played, so that the memory will not be reset at the 16th count.

When playing 16 count rhythms stored between points 17 and 32 of the memory lines, it is necessary to reset the counter so that the output starts at the 17th count and continues to the 32nd count, and then starts again at the 17th count. This action is controlled by the conductor 44 from the switch circuit 30. This conductor is connnected to the fifth stage of the counter 232 to hold this stage operative when a ground is present on conductor 44. It is well known that in a 5 bit binary counter, the first four stages operate for a count of 16, and then the fifth stage operates and the first four stages repeat their operation for counts from 17 to 32. By holding the fifth stage operative, the counter 232 counts only from 17 to 32, with the sequence repeating as clock pulses are applied.

FIG. 5 shows the coupling of indicator lights to the logic circuit. Conductor 80 from the switch circuit 30, which is grounded when the selector switch 15 is in the lower row position, is connected to the cathode of a light emitting diode 120, and conductor 84, which is grounded when switch 15 is in the upper row position, is connected to the cathode of light emitting diode 121. The anodes of these diodes are connected through resistor 122 and the emitter to collector path of transistor 123 to plus 24 volts. When the transistor 124 conducts and the conductor 80 (or 84) is grounded, the diode 120 (or 121) will be illuminated. Transistor 123 is controlled from the logic circuit by an OR gate circuit including diodes 125 and 126. At the down beat (count 1 of each rhythm pattern), the ground applied from terminal 128 of the logic circuit renders transistor 123 conducting so that one of the lamps 120 or 121 is illuminated when the conductor 80 or 84 connected thereto is grounded. A second terminal 129 of the logic circuit provides a ground to diode 126 to render transistor 123 conducting on the upbeat (count 17 or count 13). Accordingly, the diodes 120 and 121 which form the lights 16 and 17 on the control panel, indicate the beats in the rhythm pattern which is selected.

Figure 6:
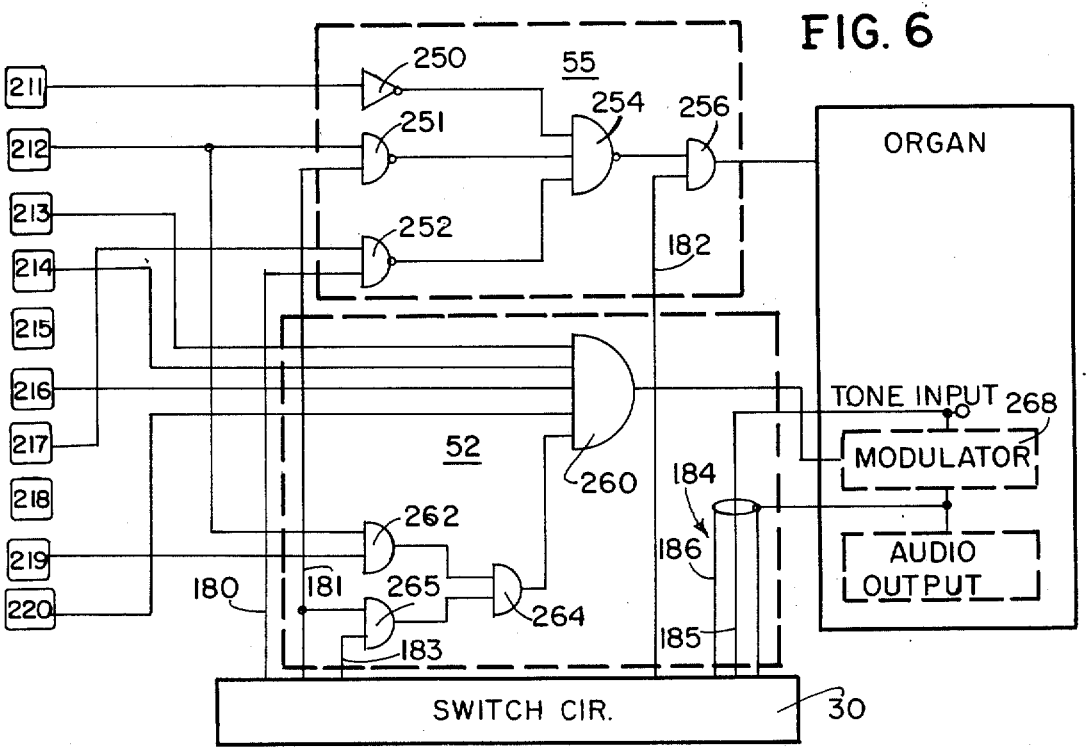
FIG. 6 shows the strummer circuits of the rhythm system.

FIG. 6 shows the circuit for providing the strummer effects which were referred to in connection with FIG. 2. The terminals 211 to 220 along the left side are the outputs from the memory planes to the instrument generators, which are shown in FIG. 4. All 10 outputs are shown although only eight of the outputs are utilized in the circuit of FIG. 6.

The strummer panel pulser circuit 55 (FIG. 2) includes an inverter 250 to which the pulses for actuating the base drum are applied from terminal 211, an AND gate 251 to which the Conga pulses are applied, and an AND gate 252 to which the Tambourine pulses are applied. The AND gate 251 is enabled by a potential from the switch circuits 30 applied on conductor 181, and the AND gate 252 is enabled by a potential from the switch circuit 30 applied on conductor 180. The outputs of the inverter 250 and the AND gates 251 and 252 are applied to OR gate 254 which passes all of the pulses to the AND gate 256. The AND gate 256 is enabled when the strummer switch 2 (FIG. 3) is operated. In the OFF position, the strummer switch grounds the conductor 182 to disable the AND gate 256, and this ground is removed when the switch is turned on. The output of the AND gate 256 is applied to the organ and may be used with a potential derived from the pedal switch of the organ, so that when there is an output from AND gate 256 and a pedal is operated, the pedal tone will be pulsed in accordance with the pulses applied to the AND gate 256.

The strummer note pulser 52 is also shown in FIG. 6, and includes a five input OR gate 260 to which the Bongo, Snare, Clave and Cymbal pulses are applied. The Conga and Short Brush pulses are applied to a two input OR gate 262 which applies the same to AND gate 264. The AND gate 264 is enabled by a second input derived from the OR gate 265. Conductors 181 and 183 are connected to the OR gate 265 to produce an output for enabling the AND gate 264 when either of switches 11 or 12 is operated to provide the Rhumba or Bossa Nova rhythms. The output of AND gate 264 is applied as the fifth input to OR gate 260, to be combined with the other rhythm pulse inputs applied thereto.

The output from OR gate 260 is applied to a modulator 268 which may be provided in an electric organ. The tone inputs from the organ are selectively applied to the modulator by known organ circuitry, and the modulator 268 interrupts or strums the tones in accordance with the particular rhythm patterns which are applied thereto from OR gate 260. The output of the modulator is applied to audio amplifiers and transducers, as in standard electric organs. For disabling the action of the modulator, a coaxial line 184 is provided having a center conductor 185 connected to the tone input, and an outer conductor 186 connected to the output of the modulator 168. The center connector 185 and the outer conductor 186 are selectively shorted by the upper left section of strummer switch 2 of the switch circuit 30 (FIG. 3) when it is in the OFF position. This applies the audio tones directed to the audio output, bypassing the modulator. When the strummer switch 2 is operated, however, the short is removed from the coaxial line 184 so that the tones are applied through the modulator to the audio output. This may be used to interrupt or strum chords supplied from the accompaniment manual of the organ to the audio output.

The automatic rhythm system which has been described is easily operated by an organist or one playing another instrument, and will automatically provide one of a relatively large number of different rhythm patterns, with the speed and volume being controlled by the operator. By utilizing each pushbutton for two rhythm patterns, with a selector for selecting the one desired, the number of controls is substantially reduced. Each rhythm pattern may cause operation of one or more rhythm or percussion instruments, and a plurality of rhythm patterns can be operated at the same time. A rhythm break can be provided, either while playing another rhythm pattern, or when no other rhythm is being played. The rhythm break can be one of a number of different breaks, such as a drum break, depending upon the rhythm pattern which is selected. If the rhythm on-off switch is in the ON position, the rhythm selected will play, but if it is in the OFF position, the rhythm will not play but the break will be provided when the Rhythm Break button is pressed. Other touch buttons are provided for inserting other percussion sounds, such as a Crash Cymbal or a Snare Drum Roll, upon actuation by the operator.

The rhythm patterns are stored in memory elements which are arranged so that the maximum number of rhythm patterns are provided in a minimum amount of storage. The memory elements are controlled by a logic circuit coupled to a switch circuit which is actuated by the pushbuttons, the selector switch and the rhythm break switch. The switching circuit also controls the clock frequency through a divider, with a variable tempo control also being available for controlling the clock frequency. The various circuits are integrated in a single system so that the overall equipment can be provided as a compact and inexpensive unit.

I claim:

1. An automatic rhythm system, including in combination, memory means having a plurality of selectively enabled sections for storing rhythm patterns, each of said sections having a plurality of inputs and selectively enabled output means, with said inputs being selectively coupled to said output means in accordance with a rhythm pattern, scanning means connected to said memory means and having portions individually connected to said inputs of a plurality of said sections for applying pulses to said inputs in sequence in response to the application of clock pulses thereto, clock means for applying clock pulses to said scanning means, and switch means including a plurality of selectively operated circuits connected to said clock means and to said output means of said sections of said memory means, one of said switch circuits controlling the application of clock pulses to said scanning means, and a plurality of other switch circuits selectively enabling said output means of predetermined sections of said memory means to thereby select a desired rhythm pattern.

2. The system of claim 1 wherein each section of said memory means includes a plurality of storage elements coupled to said inputs and selectively enabled in turn by pulses applied thereto by said scanning means.

3. The system of claim 2 wherein each section of said memory means has a plurality of portions, and each of said portions includes an output and a plurality of storage elements associated with a rhythm pattern individually coupled between such output and said plurality of inputs.

4. The system of claim 3 wherein at least one of said portions includes storage elements associated with two different rhythm patterns.

5. The system of claim 4 wherein the storage elements of said portion of said memory section associated with one of said rhythm patterns are coupled to said inputs to receive a first sequence of pulses from said scanning means, and the storage elements of said portion of said memory section associated with said other pattern are coupled to said inputs to receive a second sequence of pulses from said scanning means.

6. The system of claim 5 wherein said switch means applies potentials to said scanning means to selectively start and reset the same to apply pulses to said memory means in said first and second sequences.

7. The system of claim 3 wherein said portions of each section of said memory means are adapted to store rhythm patterns having different numbers of counts.

8. The system of claim 7 wherein said switch means applies a potential to said scanning means to reset the same at the number of counts associated with said rhythm pattern selected.

9. The system of claim 1 wherein said clock means includes divider means having a plurality of outputs for producing clock pulses of different frequencies.

10. The system of claim 9 wherein said switch means selectively applies pulses from one of said outputs of said clock means to said scanning means in accordance with the rhythm pattern selected.

11. The system of claim 2 wherein said scanning means includes counter means for receiving pulses from said clock means, and decoder means coupled to said counter means for applying pulses in sequence to said inputs of said sections of said memory means for enabling said storage elements thereof in turn.

12. The system of claim 11 including means coupling said switch means to said counter means for starting and resetting the same in accordance with the rhythm pattern selected by said switch means.

13. The system of claim 1 wherein said switch means includes a first group of switches each operable to select two rhythm patterns, and a second selector switch coupled to said switches of said first group for selecting one of the two rhythm patterns selected thereby.

14. The system of claim 13 including first and second indicator lights and circuit means for energizing the same coupled to said selector switch to indicate the positions thereof.

15. The system of claim 14 wherein said circuit means for operating said indicator lights is coupled to said scanning means for operating said lights in accordance with a beat of the selected rhythm pattern.

16. The system of claim 1 further including, instrument generator means for producing sounds of a plurality of rhythm instruments and having terminals for receiving potentials for controlling the individual instrument sounds, and means individually coupling said output means of said sections of said memory means to said terminals for producing said sounds in accordance with rhythm patterns selected by said switch means.

17. The system of claim 16 wherein said switch means includes a first group of switches for operating said switch circuits for causing selected rhythm patterns to be operated continuously, with said switches of said first group being operated to select one or more rhythm patterns, and a second group of switches for operating a circuit coupled to said terminals of said instrument generator means for causing a single operation thereof.

18. The system of claim 1 further including control means for receiving musical instrument signals, and means selectively coupling said output means of said sections of said memory means to said control means for controlling the instrument signals in accordance with the pulse train patterns produced at said enabled output means of said sections of said memory means.

19. The system of claim 18 wherein said control means includes a keyer for keying the musical instrument signals.

20. The system of claim 18 wherein said control means includes a modulator for modulating the musical instrument signals.

21. The system of claim 1 including a touch operated switch coupled to one of said switch circuits for disabling said output means of the memory section selected by said switch means and enabling said output means of a predetermined memory section for insertion of a special rhythm pattern, with said scanning means being coupled to said switch circuit to operate the same at the end of a single rhythm pattern to disable said output means of the predetermined memory section and enable said output means of the section selected by said switch means.

22. An automatic rhythm system, including in combination, memory means having a plurality of selectively enabled sections for storing rhythm patterns with one of said sections storing a special rhythm pattern, each of said sections having selectively enabled output means, scanning means connected to said sections of said memory means for reading out said patterns as pulse trains to said output means in response to the application of clock pulses thereto, clock means for applying clock pulses to said scanning means, and switch means including a plurality of rhythm selector switches, a rhythm break switch and circuit means controlled by said switches and connected to said scanning means and to said output means of said memory sections, said rhythm selector switches being operative to cause said circuit means to selectively enable said output means of predetermined sections of said memory means, said circuit means having a portion connected to said rhythm break switch and rendered operative thereby in response to operation of one of said rhythm selector switches to enable said one section of said memory means to produce the special rhythm pattern.

23. The system of claim 22 wherein said sections of said memory means have rhythm patterns stored therein having first and second numbers of counts, and include first and second memory sections having special rhythm patterns stored therein having said first and second numbers of counts, and wherein said circuit portion operates in response to operation of said rhythm break switch to select one of said first and second memory sections to produce a special pattern having the same number of counts as the pattern selected by said selector switch.

24. The system of claim 22 wherein said switch means further includes a rhythm ON switch operative for causing said circuit means to enable the memory section associated with the rhythm pattern selected by an operated rhythm selector switch, said circuit portion operating in response to operation of said rhythm break switch to disable the memory section for the selected rhythm and to enable said one memory section whereby the special rhythm pattern is inserted in place on the selected rhythm, and said circuit portion operating to enable said one memory section in response to operation of said rhythm break switch when said rhythm ON switch is inoperative.

25. The system of claim 24 wherein said circuit portion is connected to said scanning means to disable said one memory section when the special rhythm pattern is completed and to enable the selected memory section when said rhythm ON switch is operative.

*26. An automatic rhythm system, including in combination,*

*memory means having a plurality of selectively enabled sections for storing rhythm patterns with one of said sections storing a special rhythm pattern, each of said sections having selectively enabled output means;*

*scanning means connected to said sections of said memory means for reading out said patterns as pulse trains to said output means in response to the application of clock pulses thereto;*

*clock means for applying clock pulses to said scanning means; and*

*switch means including a plurality of rhythm selector switches, a rhythm break switch and circuit means controlled by said switches and connected to said scanning means and to said output means of said memory sections, said rhythm selector switches being operative to cause said circuit means to selectively enable said output means of predetermined sections of said memory means, said circuit means*

*having a portion connected to said rhythm break switch and rendered operative thereby in response to operation of said rhythm break switch to enable said one section of said memory means to produce the special rhythm pattern.*

*27. The system of claim 26, wherein said switch means further includes a rhythm ON switch operative for causing said circuit means to enable the memory section associated with the rhythm pattern selected by an operated rhythm selector switch, said circuit portion operating in response to operation of said rhythm break switch to disable the memory section for the selected rhythm and to enable said one memory section whereby the special rhythm pattern is inserted in place of the selected rhythm.*

* * * * *